United States Patent [19]

Kovacevich, Jr.

[11] Patent Number: 4,671,329
[45] Date of Patent: Jun. 9, 1987

[54] WINE DISTRIBUTION METHOD

[76] Inventor: Sam Kovacevich, Jr., R.R. 1, Jug Handle Rd., Minooka, Ill. 60447

[21] Appl. No.: 918,228

[22] Filed: Oct. 14, 1986

Related U.S. Application Data

[63] Continuation of Ser. No. 775,285, Sep. 12, 1985, abandoned, which is a continuation of Ser. No. 608,311, May 8, 1984, abandoned.

[51] Int. Cl.$^4$ ............................ C12G 1/00; B67D 1/00
[52] U.S. Cl. .......................................... 141/5; 426/312
[58] Field of Search .................... 141/2, 5, 85, 231; 426/312, 392, 474

[56] References Cited

U.S. PATENT DOCUMENTS

| | | | |
|---|---|---|---|
| 2,639,849 | 5/1953 | Meyer | 141/5 |
| 3,900,571 | 8/1975 | Johnson | 426/312 X |
| 3,927,700 | 12/1975 | Trinne et al. | 141/5 |
| 4,347,695 | 9/1982 | Zobel et al. | 141/5 X |
| 4,363,338 | 12/1982 | Brown | 141/5 X |

*Primary Examiner*—Stephen Marcus
*Assistant Examiner*—Mark Thronson
*Attorney, Agent, or Firm*—Ernest Kettelson

[57] ABSTRACT

A wine distribution method from winery to retail customer in which the wine is completely enclosed or sealed throughout until it is finally dispensed into a glass or carafe for customers in a restaurant or lounge or other retail establishment. The wine originates in a winery where it is stored in closed containers until it has been properly aged. It is then pumped through a sealed conduit from the winery vats into the closed tank of a tanker truck for shipment to a wholesale distributor. In accordance with this invention the wholesale distributor pumps the wine from the tank of the tanker truck through lines which are closed to air into large holding tanks which are also closed to the atmosphere. When delivered to retail restablishments, the wine is pumped from the holding tanks through a closed or air-tight system which includes a filtering device, into a filling machine which in turn flows the wine through its tubes into smaller canisters connected thereto, the canisters also being closed to the air and having outlet nozzles for air-tight connection at the retail establishment to a pressurized nitrogen tank and to a dispensing conduit which leads to a tap or faucet where the wine is ultimately poured into a glass or carafe from the canister under pressure from the nitrogen tank.

3 Claims, 10 Drawing Figures

WINE DISTRIBUTION METHOD

This application is a continuation of prior application Ser. No. 775,285 filed Sept. 12, 1985, which in turn is a continuation of prior application Ser. No. 608,311 filed May 8, 1984 both now abandoned.

BACKGROUND OF THE INVENTION

This invention relates to a method and apparatus of delivering or transporting wine in bulk from its source at the winery to retail customers without at any time exposing the wine to the atmosphere until it is ultimately poured into a glass or other container for the retail consumer.

The prior art methods of transporting wine in bulk form from wineries to retail establishments throughout the country and to the comsumer expose the wine to the atmosphere at one or more times during the process. One of the occasions when the bulk wine is exposed to air is when it has reached the retail establishment in the customary four liter glass jugs which are now used, and the employees in the retail establishment then pour the wine from the glass jugs into the dispensing canisters connected to the taps or faucets which fill the wine glasses and carafes for the end use customers. The wine is exposed to air when it is poured from the four liter glass jugs into the dispensing canisters. The wine left in the glass jugs therefore is exposed to oxygen and possible contaminants from the air which gets into the jugs before they are recapped, and the same with the wine that has been poured into the dispensing canisters. Wine that has been exposed to the air will begin to oxidize, even small amounts of pollutants in the air can contaminate the wine, yeast particles can begin to form in the containers, and the quality of the wine begins to deteriorate in a general sense once the container it is in has been exposed to the surrounding atmosphere.

There is also the question of the legality in some states of pouring alcoholic beverages from one container into another. There are also problems in complying with food and health codes when open to the air containers are used.

These problems have been solved by the present invention which keeps the bulk wine completely sealed throughout the entire delivery chain until it is poured into the consumer's glass. It also eliminates the need for the glass jugs now used in the existing method for delivering bulk wine from the wholesale distributor to the retail establishments, or for other similar wholesaler to retailer containers. In accordance with this invention, air-sealable canisters are filled by the wholesaler for sale to the retailer, of appropriate size and having air-sealable nozzles for direct connection to the dispensing lines in the retail establishment and to the pressurized nitrogen tank without exposing the wine in such canisters to the air.

SUMMARY OF THE INVENTION

It is an object of the invention to provide a completely sealed transport and distribution system for delivering bulk wine from the wineries to the consumers in restaurants and other retail establishments without exposing the wine to the atmosphere until it is poured into the consumer's glass or carafe.

It is an object of the invention to provide apparatus and equipment which is able to keep bulk wine from being exposed to the atmosphere at any time during its transportation from the winery to the retail consumer until it is being poured into his wine glass or carafe.

DESCRIPTION OF PREFERRED EMBODIMENT

Figure 1:
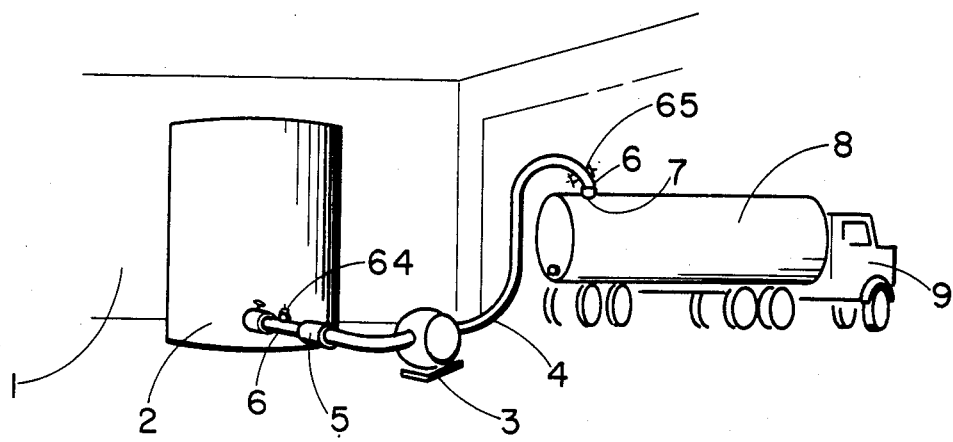
FIG. 1 is a perspective view of a storage vat in a winery having a closed conduit connected between said storage vat and the tank of a tank truck.
Figure 2:
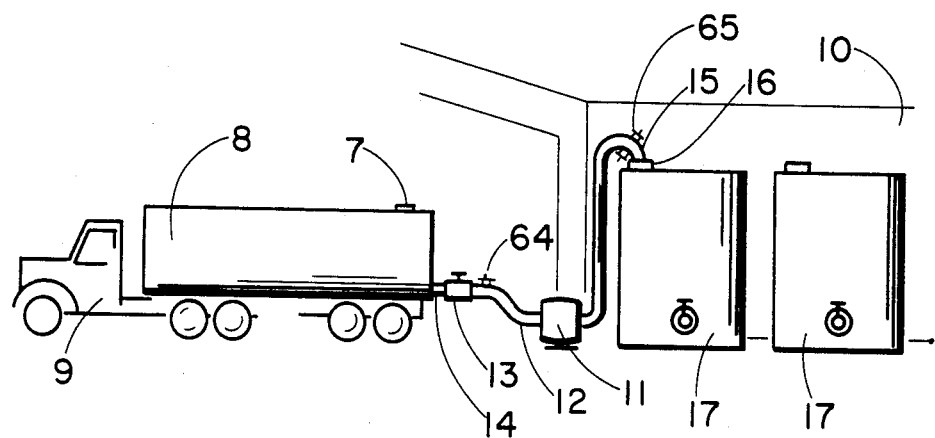
FIG. 2 is a perspective view of the tank truck of FIG. 1, storage tanks in the plant of a wholesale distributor, and a closed conduit connected between the tank of the truck and the wholesaler's storage tank.
Figure 3:
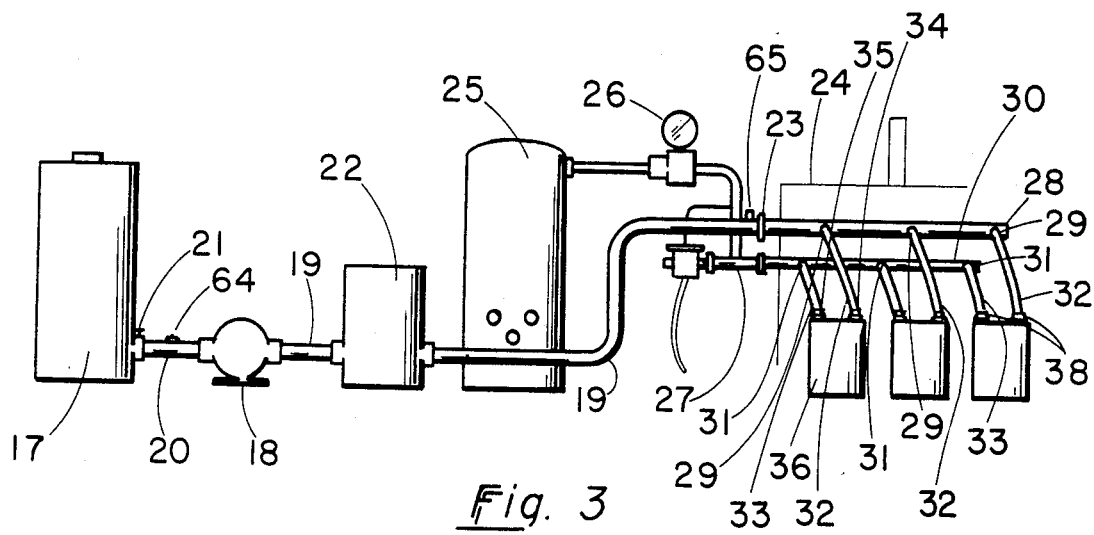
FIG. 3 is an elevation view of the wholesaler's storage tank shown in FIG. 2 connected by a closed conduit to a pump, a filter, and a filling machine, and showing a nitrogen tank also connected to said filling machine.
Figure 4:
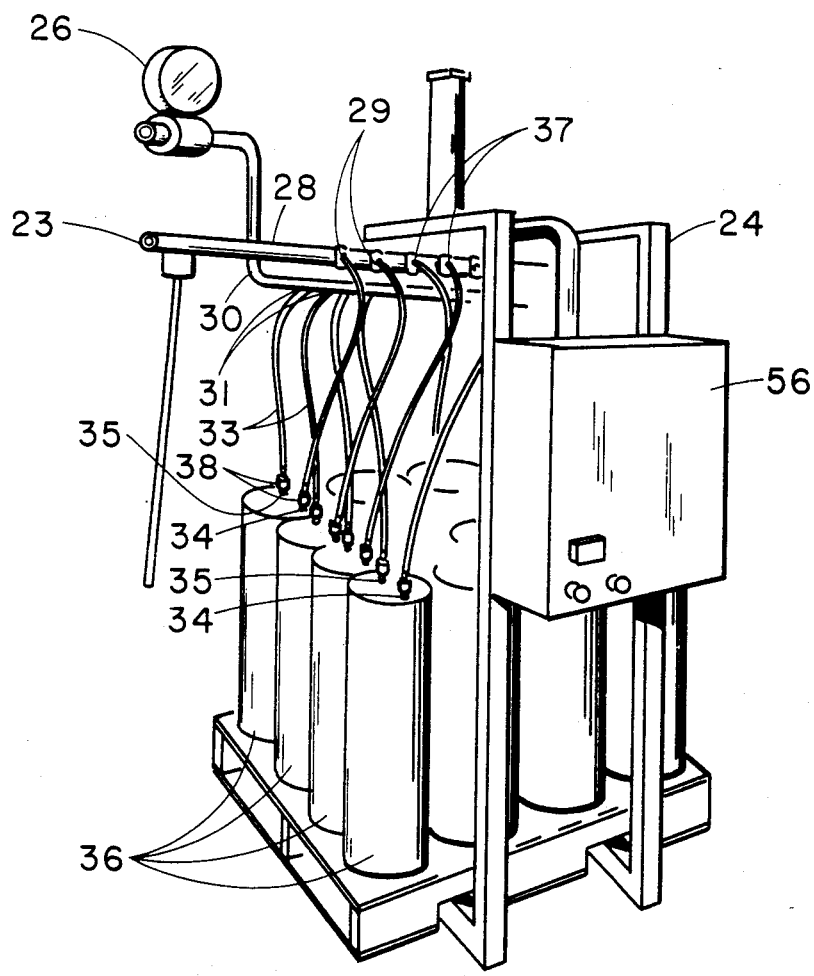
FIG. 4 is a perspective view of the filling machine shown in FIG. 3.
Figure 5:
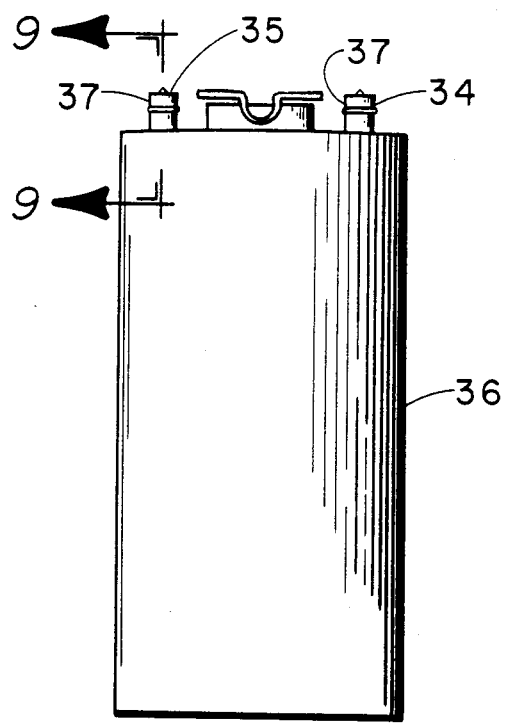
FIG. 5 is an elevation view of a portable, air tight canister for use in accordance with this invention.
Figure 6:
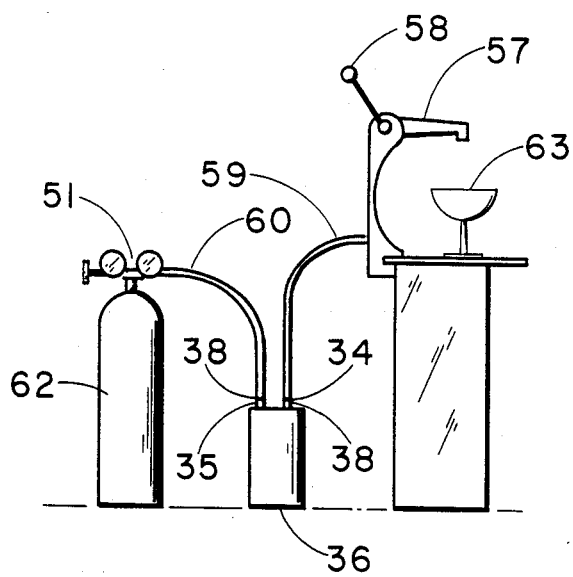
FIG. 6 is a side elevation view of a bar in a retail establishment showing a dispensing tap, a line connecting the tap to a canister as shown in FIG. 5, and a tank of pressurized nitrogen also connected to the canister.
Figure 7:
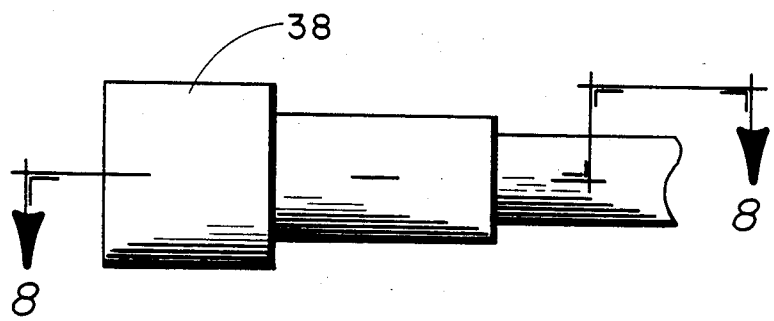
FIG. 7 is an elevation view of a coupling member for coupling the filling hoses of the filling machine shown in FIG. 4 to the canisters shown in FIG. 5.
Figure 8:
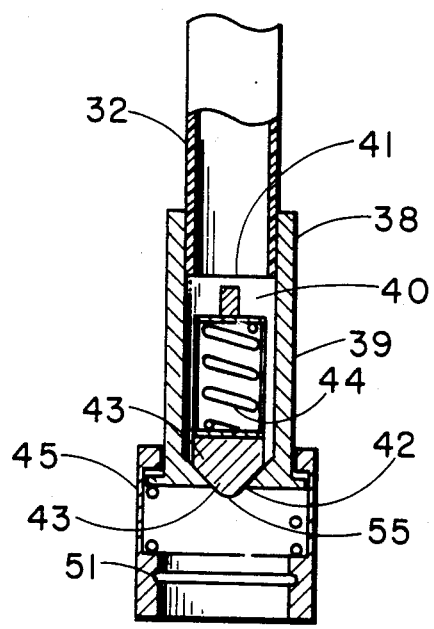
FIG. 8 is a section view taken on line 8—8 of FIG. 7.
Figure 10:
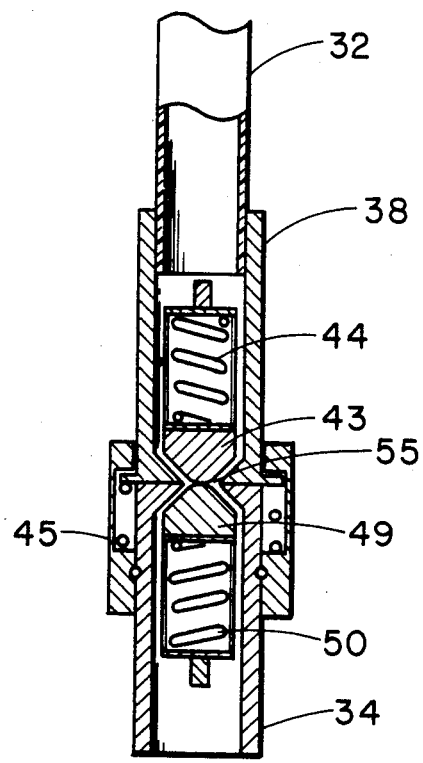
FIG. 10 is a section view of the coupling member shown in FIG. 8 in section coupled to the canister port shown in FIG. 9 in section, showing them both in coupled relationship.
Figure 9:
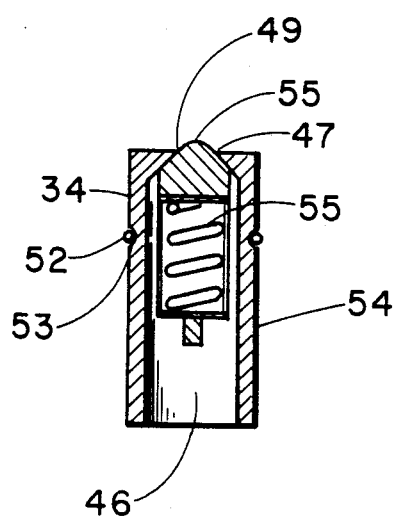
FIG. 9 is a section view taken on line 9—9 of FIG. 5.

After grapes have been crushed and made into wine at a winery 1, the bulk wine is held in vats or storage tanks 2 for a proper aging period. When ready for shipment in bulk form to a wholesale distributor, the wine is pumped from the storage tank 2 by a pump 3 through an air-sealed conduit 4 connected at one end by an air tight fitting 5 to the outlet port 6 of the storage tank 2 and at the other end by an air tight fitting 6 to the inlet port 7 of the tank 8 of a tank truck 9.

The bulk wine is transported by the truck 9 to the wholesale distributors distribution plant 10, where it is pumped from the tank 8 of the truck 9 by a pump 11 through an air-sealed conduit 12 connected at one end by an air tight fitting 13 to the outlet port 14 of the truck's tank 8 and at the other end by an air tight fitting 15, to the inlet port 16 of one of the storage tanks 17 in the wholesaler's distribution plant 10.

When ready for delivery to retail establishments, the bulk wine is pumped from the wholesaler's storage tank 17 by a pump 18 through an air-sealed conduit 19 connected at one end by an air tight fitting 20 to the outlet port 21 of the storage tank 17, then through a filter 22, and connected at the other end of the air-sealed conduit 19 to the wine inlet port 23 of a filling machine 24.

A pressurized tank 25 filled with pressurized nitrogen is connected through a regulating valve 26 to a pressurized gas inlet port 27 of the filling machine 24.

The wine inlet port 23 of the filling machine 24 opens to an elongated horizontally extending wine distribution tube 28, which has a plurality of outlet ports 29 spaced apart throughout its length.

The pressurized gas inlet port 27 of the filling machine 24 opens to a similar horizontally extending gas distribution tube 30 which extends parallel to the wine distribution tube 28. The gas distribution tube 30 also includes a plurality of outlet ports 31 spaced apart throughout its length. The outlet ports 31 of the gas distribution tube 30 are located in close proximity to corresponding respective outlet ports 29 of the wine distribution tube 28.

A pair of flexible hoses 32 and 33 are connected between respective canister inlet ports 34 and 35 of a supply canister 36 and respective outlet ports 29 and 31 of the wine and pressurized nitrogen distribution tubes 28 and 30. The flexible hose 32 is connected to outlet port 29 of the wine distribution tube 28, and flexible hose 33 is connected to outlet port 31 of the nitrogen distribution tube 30, by respective air tight fittings 37.

Flexible hose 32 is connected to inlet port 34 of the supply canister 36 by an air-tight coupling member 38, and flexible hose 33 is connected to inlet port 35 of supply canister 36 by a similar coupling member 38. The coupling members 38 include a cylindrical body portion 39 having a cylindrical bore 40 therethrough, open at end 41 to receive a corresponding end of a flexible hose 32 therein, the end portion 41 being bonded or otherwise affixed to the portion of hose 32 received therein to permanently affix coupling member 38 to the flexible hose 32. The other end of the cylindrical bore 38 has a reduced diameter opening 42 in which a button valve 43 is seated to close the opening 42, such valve 43 being normally biased to the closed position by a compression spring 44. An annular lock collar 45 is slidingly mounted on the outer end portion of the cylindrical body 39 for reciprocal movement therealong between a locked and coupled position and an unlocked-uncoupled position relative to the inlet port 34 or 35 of the canister 36 to which the flexible hoses 32 and 33 are respectively connected.

The inlet ports 34 and 35 include a cylindrical bore 46 fully open at the downstream end which opens to the interior of the canister 36, and having a reduced diameter opening 47 at the other end in which a button valve 49 is seated to close the opening 47, such valve 49 being normally biased to the closed position by a compression spring 50.

The outer diameter of the cylindrical inlet ports 34 and 35 corresponds to the inner diameter of the annular lock collar 45, whereby such inlet ports are received into the bore of the lock collar 45 when the downstream end of the cylindrical body 39 of coupling member 38 is placed against the outer or upstream end of inlet port 34 or 35 and the lock collar then moved reciprocally in the downstream direction to the locked and coupled position. In such position, an annular recess 51 opening to the interior of the lock collar 45 comes into registration with an O-Ring 52 seated in an annular recess 53 formed in the outer cylindrical wall 54 of the inlet ports 34 and 35. The O-Ring 52 is of elastomeric material, and compresses as the lock collar 45 is moved toward the locked and coupled position along the outer wall 54 of the inlet port. When annular recess 51 of the lock collar 45 comes into registration with O-Ring 52, it then is able to expand back to its original dimension and sealingly seat in the annular recess 51 of lock collar 45, thereby locking the coupling member 38 to the inlet port 34 or 35 with the corresponding abutting ends of the coupling member 38 and inlet port 34 or 35 held tightly together. At such time, the respective button valves 43 and 49, which normally protrude from their respective openings when biased to their closed positions, come into contact with each other at their projecting apexes 55 forcing each valve 43 and 49 to move inwardly of the respective cylindrical bores whose reduced openings they normally close. As the valves 43 and 49 are moved inwardly away from the respective reduced openings 42 and 47 of the coupling member 38 and inlet port 34 or 35, a through passageway opens through such openings 42 and 47 for fluid to flow from the flexible hoses 32 and 33 through the respective inlet ports 34 and 35 and into the canister 36.

When the canister 36 is filled with wine through flexible hose 32, and a desired amount of nitrogen has been flowed through flexible hose 32 into the canister 36, the hoses 32 and 33 are disconnected by sliding the lock collar 45 of coupling members 38 in the upstream direction which forces the O-Ring 523 to become unseated from the annular recess 51 of the lock collar 45. The coupling members 38 can then be separated from the canister inlet ports 34 and 35, at which time the valve members 43 of the coupling members 38 and the valve members 49 of the inlet ports 34 and 35 are biased back to their closed positions by their respective compression springs, thereby sealing their respective openings from the atmosphere to prevent entrance of air into the hoses 32 and 33 and the canister 36.

Each of the plurality of outlet ports 29 along the wine distribution tube 28 has a flexible hose 32 connected thereto by air-tight fittings 37. Each of the plurality of outlet ports 31 of the gas distribution tube 30 also has a flexible hose 33 connected thereto by air-tight fittings 37. Thus, a plurality of canisters 36 can be filled simultaneously by the filling machine 24.

The filling machine 24 includes a control panel 56 to start the filling operation and control such operation until all of the canisters 36 have been filled. The filling machine 24 is of the type available from FMC Corporation, Beverage Equipment Division, 4601 West Ohio Street, Chicago, Ill., sold and known as the MOJONNIER level-scan manifold. The machine includes a sensing mechanism which automatically stops flow of material to each canister 36 when it becomes filled. When all of the canisters connected to the plurality of hoses 32 and 33 have been filled, an audible alarm sounds to alert the operator that all of the canisters have been filled. The hoses 32 and 33 are then disconnected, and the filled canisters 36 are then ready for delivery to the retail establishments. The filling machine 24 as herein described and available from vendors has not heretofore been used for flowing wine and nitrogen to fill the canisters 36.

Nitrogen is flowed through the filling machine 24 and into the canisters 36 to completely fill any void and thereby provide additional protection of the bulk wine by further preventing air and oxygen from seeping in. The amount of nitrogen to use is determined by the wholesale distributor, and the regulating valve 26 is set to deliver that pre-determined amount.

When the canisters 36 are delivered to a retail establishment, they may then be connected directly to the dispensing system which includes a faucet or tap 57, having a valve therein movable between an open and closed position by an operating lever 58. A dispensing conduit 59 leads from the tap 57 to which it is connected at one end directly to the port 34 of canister 36 by a coupling member 38 on the end of the dispensing conduit 59 being coupled to the canister port 34 as described above. At such time, the button valves 43 and 49 of the coupling member 38 and canister port 34 are forced inwardly away from their respective openings, providing a through passageway completely closed to the atmosphere for the wine to flow from the canister 36 into the dispensing conduit 59 to the tap 57.

The other canister port 35 is connected to a hose 60 having a coupling member 38 at one end which is coupled to canister port 35 in the manner described, the other end being connected to the control valve assembly 61 on a tank 62 of pressurized nitrogen. When hose 60 is connected to canister port 35, pressurized nitrogen is available through hose 60 to the interior of the canister 36 to force wine to flow through the dispensing conduit 59 when the operating lever 58 of the tap 57 is moved to the valve open position. Wine thereupon flows from the tap 57 to fill a wine glass 63 for a customer of the restaurant or other retail establishment.

During all of this time from the winery until dispensed into the wine glass, the bulk wine has been sealed from the atmosphere, from the air, from oxygen and from pollutants in the air, all of which can contaminate or otherwise adversely affect the quality of the wine.

The air sealed conduits 4 (between winery storage tank 2 and truck tank 8), 12 (between truck tank 8 and wholesaler's storage tank 17), and 19 (between wholesaler's storage tank 17 and filling machine 24) are first connected at each end by their respective air-tight fittings before any wine is allowed to enter. Then a supply of pressurized nitrogen is flowed into and through such conduits until they are filled with nitrogen to completely expel any air that may otherwise be in them. Nitrogen or gas inlet valves 64 are provided at the upstream end of each of said air-sealed conduits to flow nitrogen in, and gas outlet valves 65 are provided at the downstream end thereof to expel air and any other gases as they are displaced by the infusion of nitrogen. The air is similarly removed from the storage tanks 2, 8 and 17, as well as from the flow passageways of filling machine 24, after which the air sealed conduits 4, 12 and 19 are opened to flow the bulk wine therethrough.

The storage tanks 27 in the wholesaler's distribution plant each are large enough to hold about six thousand gallons of wine. The canisters 36 are of a size which is convenient and appropriate for retail establishments, such as nineteen liters, or eleven and a half liters, or five gallons, or three gallon size depending on the requirements of each particular retail establishment.

I claim:

1. A method of distributing wine in bulk form, comprising the steps of providing completely closed conduit means to flow and transport wine therein without any exposure to the atmosphere beginning with the time when the wine leaves the winery where the wine is first made at a first location until it arrives at a second location remote from said first location and ending when the wine is poured into an open to the air container from which an end use consumer is to then drink the wine, including the steps of moving the wine from said winery where it is first made to said second location, receiving said wine at said second location, moving said wine from said second location to a final destination where the wine is poured into an open to the air container from which a said end use consumer is to then and there drink teh wine, including the step of pouring said wine into said open to the air container for an end use consumer to then and there drink, said steps of moving the wine from the winery to said end use consumer including the step of flowing and transporting said wine through said completely closed conduit means from said winery to said end use consumer, keeping said closed conduit means having said wine therein mechanically sealed against entry of air throughout the entire time said wine is being flowed and transported from said winery to said end use consumer, keeping said wine from exposure to air during such entire time, mechanically sealing each portion of said conduit means in which said wine is to be flowed against entry of air prior to flowing said wine therein, expelling any existing air therefrom prior to flowing said wine therein, then opening said portion of said conduit means for entrance of said wine therein, said step of expelling the air from said closed conduit means includes the step of filling said closed conduit means with nitrogen to displace said air, including the steps at said second location of flowing said wine into first holding tanks when received from said winery through said closed to air conduit means, flowing said wine from said first holding tanks through said closed to air conduit means to a filling machine, connecting a plurality of small portable closed to air containers to said filling machine by way of closed to air connecting conduits, and flowing said wine from said first holding tanks through said closed to air connecting conduits into said portable closed to air containers for delivery to said final destination.

2. A method of distributing wine in bulk form from a winery to a remote location for end use consumption, including the steps of connecting a first air-tight conduit between a storage container at said winery and a closed container on a vehicle, moving said vehicle to an intermediate location, connecting a second air-tight conduit between said closed container on said vehicle to a relatively large storage container at said intermediate location, connecting a third air-tight conduit between said relatively large storage container at said intermediate location and a filling machine, connecting a plurality of fourth air-tight connecting conduits to a corresponding plurality of smaller portable closed to air containers for delivery to locations remote from said intermediate location, expelling any existing air from said air-tight conduits, containers and filling machine prior to flowing said wine therein, mechanically sealing each of said air-tight conduits, containers and filling machine against entry of air prior to flowing said wine therein, flowing said wine through said first air-tight conduit into said container on said vehicle after it is connected, after said first conduit and container on said vehicle have been mechanically sealed against entry of air, after any existing air has been expelled therefrom and before moving said vehicle to said intermediate location, then flowing said wine through said second air-tight conduit into said relatively large storage container after it is connected, after said second conduit and said relatively large storage container have been mechanically sealed against entry of air and after any existing air has been expelled therefrom, flowing said wine through said third air-tight conduit into said filling machine after it is connected, after said third conduit and said filling machine have been mechanically sealed against entry of air and after any existing air has been expelled therefrom, flowing said wine through said plurality of fourth air-tight connecting conduits into said corresponding plurality of smaller portable closed to air containers after they have been connected, after said connecting conduits and said corresponding smaller portable containers have been mechanically sealed against entry of air and after any existing air has been expelled therefrom, including the steps of delivering said smaller, mechanically sealed portable containers to said remote locations for end use consumption of said wine, and connecting corresponding fifth air-tight conduits between respective ones of said smaller containers and corresponding outlet taps to flow wine from smaller, mechanically sealed portable containers through said taps for end-use consumption of said wine at said remote locations.

3. A method of distributing wine in bulk form from a winery to a remote location for end use consumption as set forth in claim 2 wherein said steps of expelling any existing air from said first air-tight conduit, from said second air-tight conduit, from said third air-tight conduit, from said fourth air-tight connecting conduits, from said containers and from said filling machine includes the steps of filling said air-tight conduits, said containers and said filling machine with nitrogen to displace said air prior to mechanically sealing each of said air-tight conduits, containers and filling machine respectively against entry of air.

* * * * *